July 10, 1923.
F. B. HAYES
VALVE
Filed Feb. 12, 1920
7 Sheets-Sheet 7
1,461,168
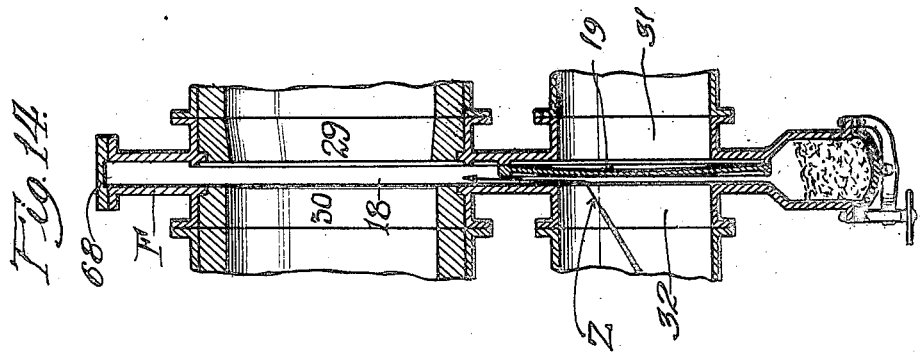
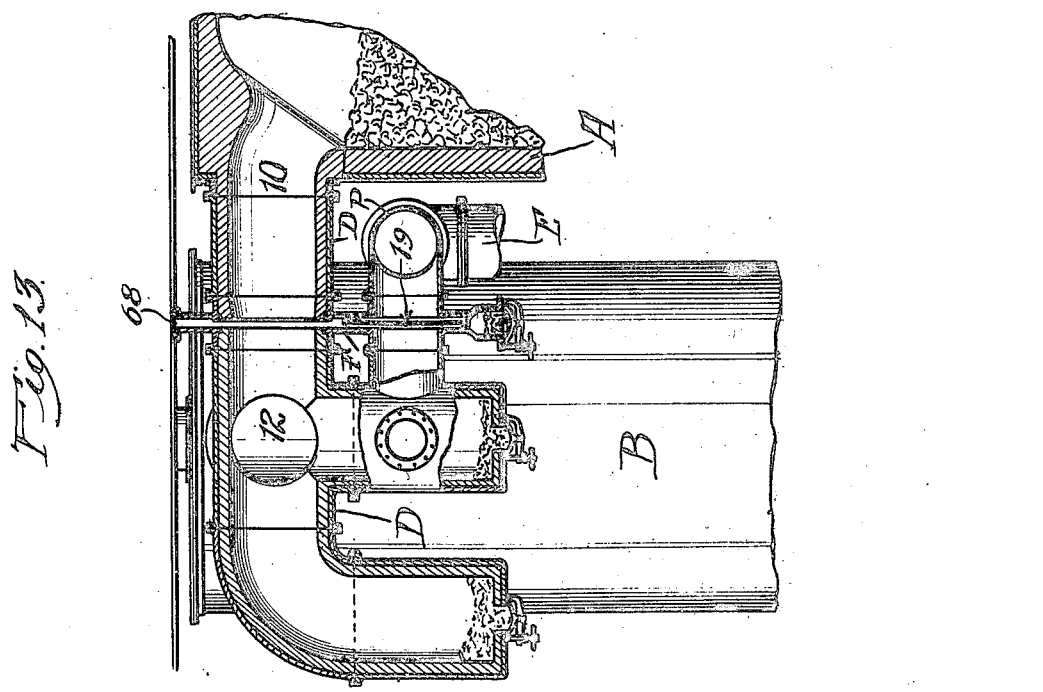
Witness:
B. L. McGregor
L. A. Perlow
Inventor:
Fred B. Hayes.
By his Atty.

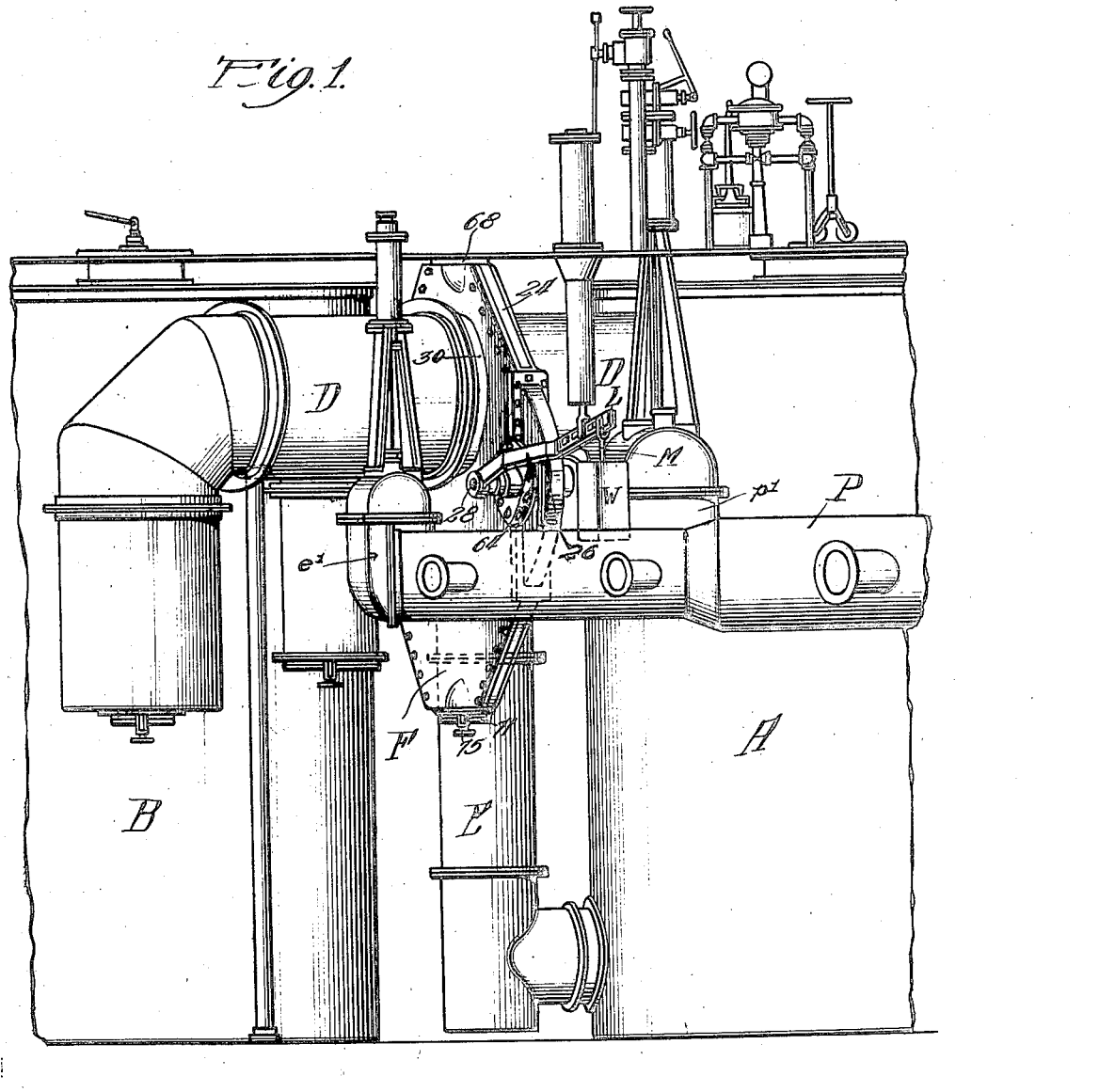

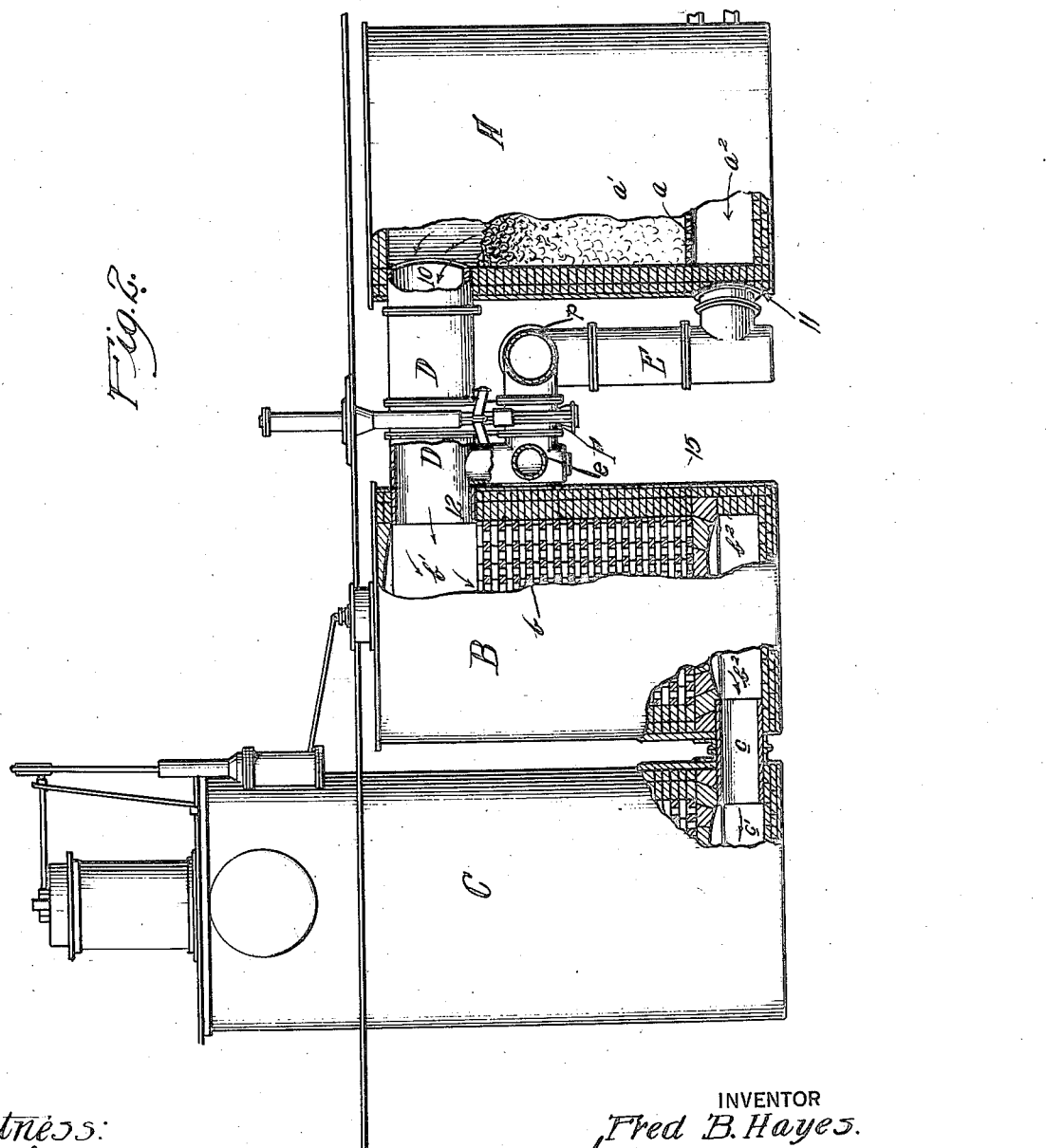

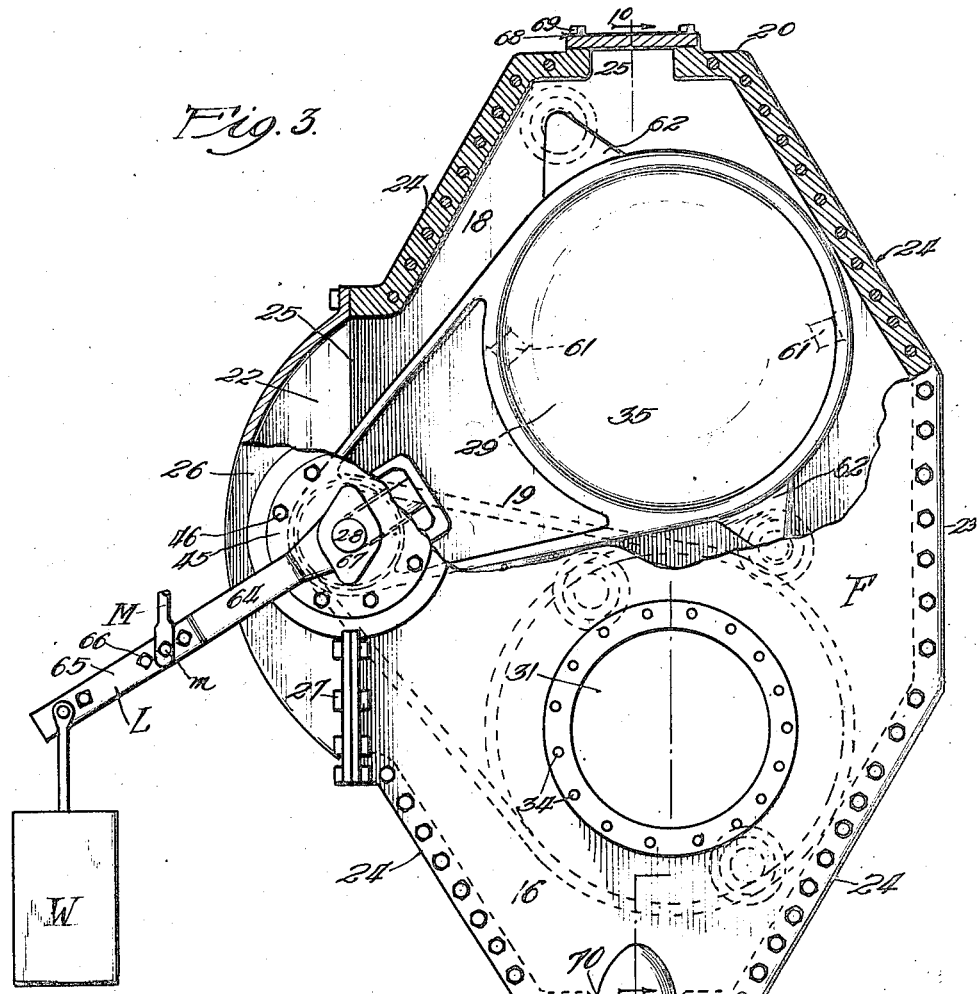
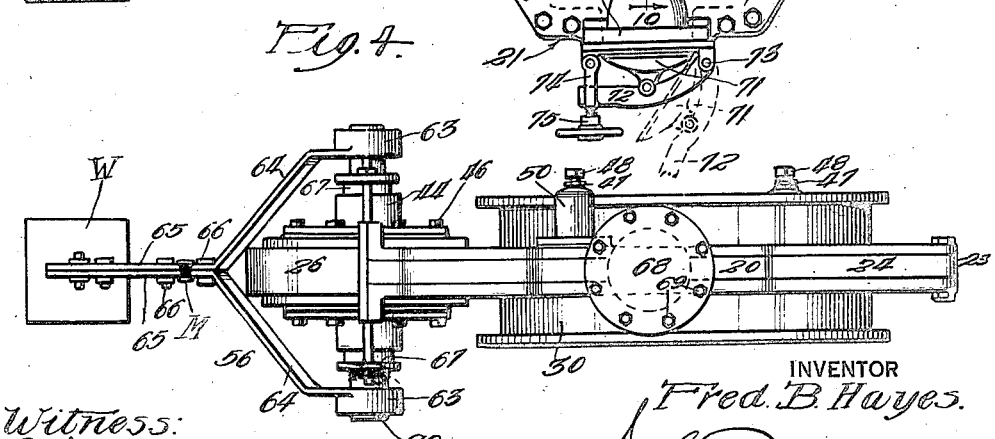

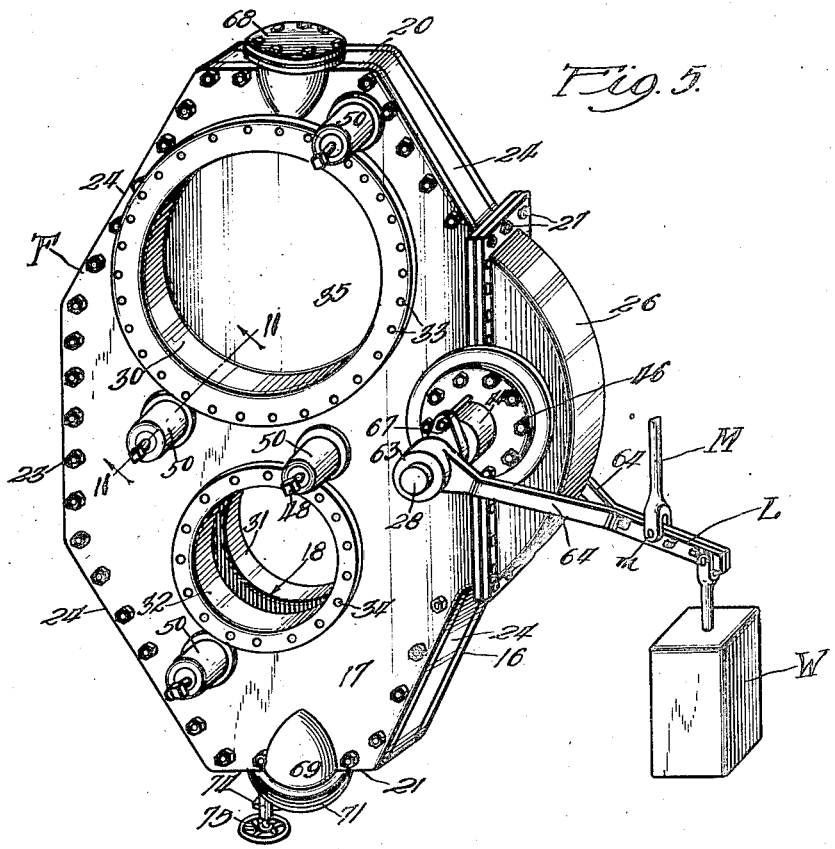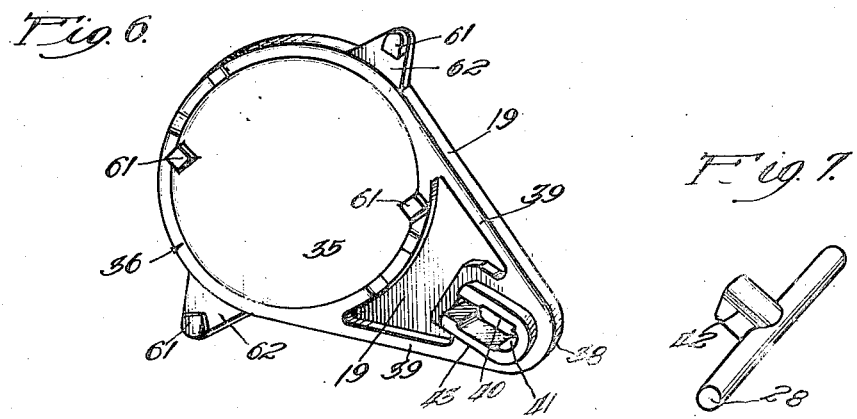

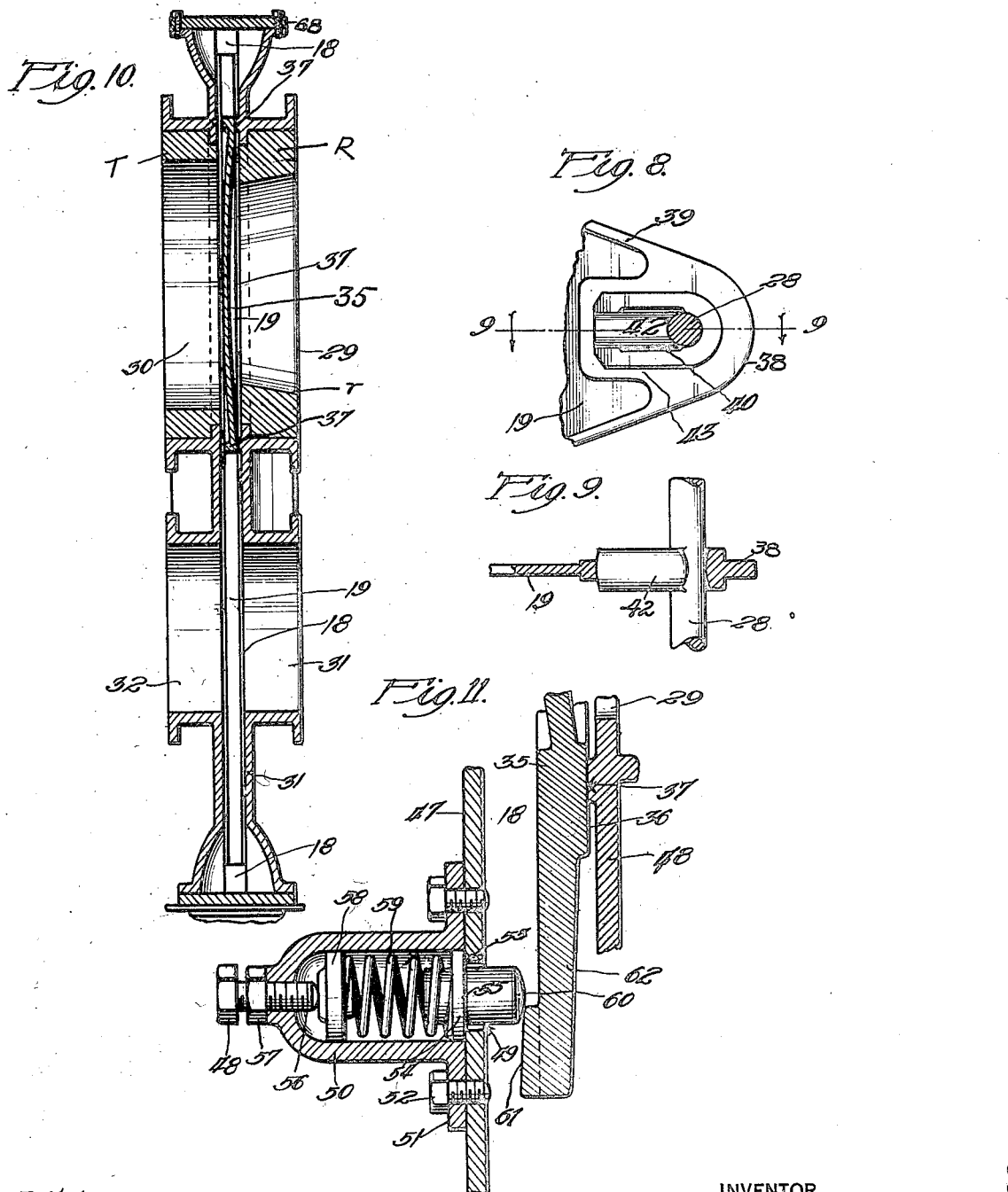

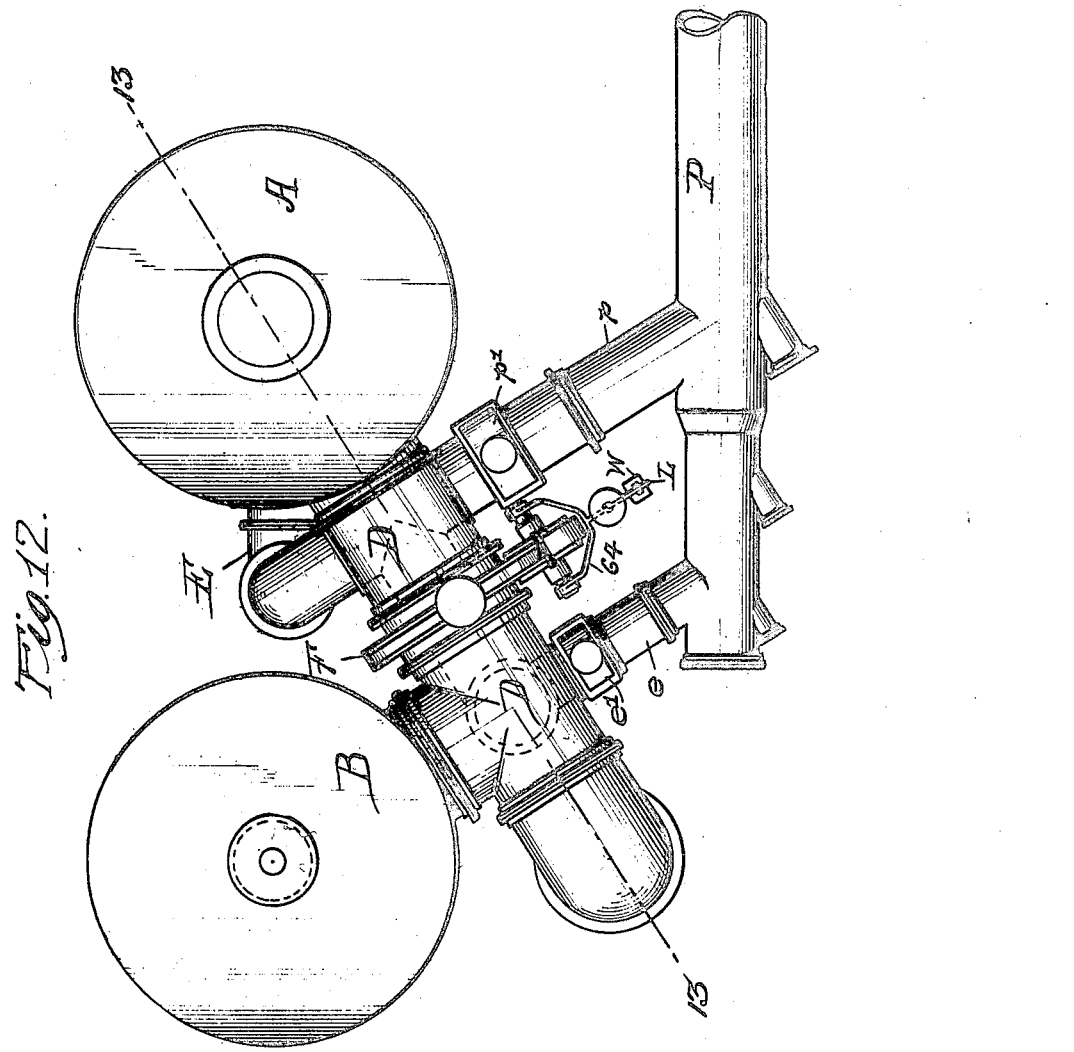

Patented July 10, 1923.

1,461,188

UNITED STATES PATENT OFFICE.

FRED B. HAYES, OF FORT WAYNE, INDIANA, ASSIGNOR TO THE WESTERN GAS CONSTRUCTION COMPANY, OF FORT WAYNE, INDIANA, A CORPORATION OF INDIANA.

VALVE.

Application filed February 12, 1920. Serial No. 358,096.

*To all whom it may concern:*

Be it known that I, FRED B. HAYES, a citizen of the United States, residing at Fort Wayne, in the county of Allen and State of Indiana, have invented certain new and useful Improvements in Valves, of which the following is a specification, reference being had to the accompanying drawings, and to the reference characters marked thereon, which form a part of this specification.

This invention relates to water gas machines and more particularly to valve constructions in such machines, wherein producer gas is formed by means of air and steam blasts forced alternately through the fire in the generator element. That is to say, it relates more particularly to the hot air valve located between the ports by which the gases pass from the generator element to the carburetter element of such machines.

In water gas machines, as heretofore used, the generator element is usually filled with coke spread over a large surface area, as for example, a surface say nine feet in diameter. Not infrequently the mass of coke will be as much as ten feet deep. A suitable air blast is provided beneath the grate so that the gases generated from the incandescent coke will pass up through the mass of coke and out through a passage at the top of the generator, into a suitably valved conduit leading into the top of the carburetter element, and from thence the gases pass downwardly through the usual checker brick construction and on to a superheater element of the machine or apparatus. After the mass of coke has been thus blasted to incandescence, the air blast is shut off and steam is introduced beneath the fire. The steam in passing upwardly through the red hot coke forms producer gas which in turn passes out through the same passage or opening at the top of the generator before mentioned, into the same valved conduit and on to the carburetter. This cycle of blasting and steaming is alternately repeated at short intervals, of say three minutes blast, four minutes steam, three minutes blast, etc.

It has been found very desirable, however, to alternately introduce the steam at the bottom and then at the top of the generator. To force the steam down through the fire, requires, in addition to the valved conduit first mentioned, an opening in the lower part of the generator whereby the producer gas may pass out and through a second valved conduit into the carburetter. The valve in one conduit must be closed when the producer gas is passing downwardly and outwardly, and vice versa, the valve of the lower conduit must be closed when the producer gas is passing outwardly through the upper conduit. Moreover, these two valves must be so connected by mechanism, more or less complicated, that one will open automatically when the other is closed. A water gas machine equipped with such an arrangement of valves operates on what is familiarly known as the "up and down run system".

In such machines, among other specific improvements heretofore employed, was a valve structure employing a sort of two-way valve, with two ports in its housing on the generator side and one on the carburetter side, and with an interiorly arranged floating gate or disc member adapted to cover first one and then the other port. Such valves have been of relatively large size, with the two ports a considerable distance apart, so that it has been necessary to construct valve structures with interior passageways or conduits whereby the gases of the "up run" will pass not only from the upper part of the generator, through the valve structure to the single valve outlet into the carburetter, but also that the gases from the "down run" will pass from the lower port and upwardly through the body of the valve structure and out through the single exit port thereof into the carburetter.

In addition to the space occupied by such large valve structures and the original high cost of manufacture, many objections to their use have presented themselves. For example, such valves of large areas, it is found in use, become heated, burned out and quickly deteriorate in value, making costly replacements necessary. The tendency to become overheated and burned out is enhanced by the fact that eddy currents form as the gas passes from one part of the valve structure to another. Moreover, the distortion of the valve gate due to heating produces leakage on the one hand or "sticking" on the other hand, thus making the working of the valve gate or seat imperfect, irregular and hard to control.

It is the principal object of my invention to overcome the foregoing difficulties, and others not mentioned, by a relatively cheap, durable and easily operated valve structure which will be connected to both conduits between the generator and carburetter elements, and which will function not only in the "up and down run" systems but also in the "up run" type of apparatus first above referred to. Another object is to provide such a construction of valve as to eliminate all tendency to wedging or binding action of the valve gate or valve closure proper, due to overheating by providing a maximum of surface area for air cooling. Another object of the invention is to reduce the metal of the valve housing or structure to a minimum by making a very narrow gap or space between the two inside walls of the structure constituting the valve seat and providing a very thin valve gate or disc—one of minimum thickness. Another object is to provide a valve structure readily applied to the types of machine or apparatus referred to and which will be durable, efficient and not require frequent renewal or repairs. The invention will be more fully comprehended by reference to the accompanying drawings, and as I proceed with my specification.

In said drawings:

Fig. 1 is an elevation of a portion of the carbureter and generator elements and associated parts of a water gas apparatus, illustrating my invention.

Fig. 2 is an elevation upon a smaller scale, and partly in section, of a water gas apparatus, which illustrates my invention in a slightly modified form.

Fig. 3 is a side view, partially in section, of the valve, enlarged, showing that side located adjacent to the generator element of the machine.

Fig. 4 is a top plan view of the valve, its operating lever and counterweight.

Fig. 5 is a perspective view of the valve, disconnected, showing the side located adjacent to the carbureter element of the machine.

Fig. 6 is a perspective view on a smaller scale, of the valve gate or closure member, removed from the valve body.

Fig. 7 is a perspective view of the rocking pin or shaft, positioned in the end of the valve gate, by which the latter is shifted from one position to another.

Fig. 8 is a plan view of the end of the valve gate with the rocking pin or shaft in position, the latter being in section.

Fig. 9 is a view of the same, partly in section, the section being in the plane indicated by the line 9—9 of Fig. 8.

Fig. 10 is a longitudinal, cross-sectional view of the valve body and valve gate, the section being taken on the plane indicated by the lines 10—10 on Fig. 3.

Fig. 11 is a vertical sectional view on line 11—11 of Fig. 5, of the spring actuated plunger for engaging a wedge on the valve gate and holding the latter to its seat.

Fig. 12 is a plan view of that portion of a water gas machine to which my improved valve is applied.

Fig. 13 is a vertical sectional view through the conduit D, the section being taken in the plane of the dotted line 13—13 of Fig. 12.

Fig. 14 is a sectional view, enlarged, of that part of Fig. 13 illustrating the valve F, to more fully disclose the air passage hereinafter referred to.

Referring now more particularly to the machine illustrated in Fig. 2, I point out that the generator element is indicated at A, the carburetter element at B, and the superheater element at C. The generator will be provided interiorly with a grate $a$, a coke chamber $a'$, an exhaust port 10, located above the coke chamber, an ash pit $a^2$ below the grate and an exhaust port 11 leading therefrom. The carburetter B will have the usual interior "checker-brick" construction $b$, above which is a chamber $b'$ connected with an inlet port 12. The carburetter B is also provided with a lower chamber $b^2$ which connects with a correspondingly located chamber $c'$ in the superheater by means of the conduit $c$.

A valved conduit D connects the exit port 10 of the generator with the inlet port 12 of the carburetter and a valved conduit E adjacent to but on a lower level than the conduit D, connects the exhaust port 11 of the generator with the conduit D by a suitable inlet port on the carburetter side of the conduit P.

In the arrangement shown, a valve construction F having a gate adapted to swing alternately across the interior passageway of the conduits D and E is provided with suitable operating mechanism whereby when one conduit is closed, the other conduit is open, and vice versa. That is to say when the conduit E is closed, the conduit D is open and free passageway for the producer gas from the generator element to the carburetter element is afforded through the exit port 10, the conduit D and the inlet port 12, and when the conduit D is closed, the conduit E is open, so that a free passageway is afforded from the generator to the carburetter through the exhaust port 11, the conduit E, to the inlet port 14, conduit D and port 12.

The producer gas formed in the generator A is thus carried by the up and down flow from the generator to the carburetter through the conduits D and E alternately and thence passes down through the checker brick construction, through the conduit c and into the superheater. Fig. 2 is illustrative and not intended to show the various details of mechanism, but rather how I use and locate a single and very thin valve structure to control the two conduits D and E. This valve structure will now be more fully described.

Referring now to the detailed construction illustrated in the remaining figures, it will be seen that the valve housing F is provided on each of its faces with a cover plate, suitably bolted thereto. The cover plate 16 is on the generator side and the cover plate 17 on the carburetter side. The housing F and the two cover plates thus form an interior chamber 18, within which the valve proper, 19, is located. The housing F is an irregular octagon in shape, having a relatively short top 20 and bottom 21 and two parallel side margins 22, 23, at right angles to the top and bottom, and these end and side margins joined by inclined portions 24, 24. The side 22 is a flat, flanged surface, surrounding an opening 25, and said opening is closed by a flange cover plate 26, secured to the housing F by bolts 27. This apertured part 22, 25 of the housing F and the cover plate 26 are so arranged as to afford and also provide a suitable bearing for the transversely arranged rocking or trunnion shaft 28 hereinafter described and upon which shaft the structure of the valve 19 is mounted.

An inlet port 29 on the generator side registers with an outlet port 30 on the carburetter side and a lower inlet port 31 on the generator side registers with an outlet port 32 on the carburetter side. The conduit D connects with the ports 29 and 30 while the conduit E connects with the ports 31, 32, such connection being made in the usual manner, to-wit: by bolts 33, 34, respectively, through suitable flanges.

The interior of the housing F is so arranged, see Figs. 10 and 11, as to afford the central space or chamber 18 previously referred to, and it will be noted that this space is quite narrow; that is to say, the distance between the proximate faces of the two walls of the housing defining the space 18, is just sufficient to accommodate the thickness of the valve 19 and certain operating parts hereinafter mentioned. The very narrowness of the chamber 18, I consider a very important structural feature of my invention. This chamber 18 is particularly indicated by the solid black of the lower portion of Fig. 5.

The valve proper, 19, consists, as shown more particularly in Figs. 3 and 6, of a disc member 35 of sufficient diameter to cover the larger of the two sets of openings, to-wit: the openings 29, 30. Said disc or gate 35 is provided on each of its faces with an annular bearing ring or surface 36, which when the valve gate or disc 35 is near the upper portion of the housing F and opposite the openings 29, 30, will bear against the face of an interior, annular and slightly raised rib 37 surrounding the opening 29.

The valve 19 as a whole is kite shaped, as shown in Fig. 6. That is to say, it comprises the disc shaped large end 35 and a small circular end 38, and rib margins 39 joining the two ends. At the small end 38 there is a transversely arranged aperture 40, generally rectangular in shape, its longer dimension being parallel with the longitudinal dimension of the valve 19. Said aperture terminates at its outer end in a semi-cylindric recess 41. The rocking or trunnion shaft 28 is provided with a generally rectangularly shaped lug 42 adapted to enter the aperture 40, and a portion of this shaft 28 rests in the recess 41. The shaft is thus firmly, yet removably united with the valve 19.

The ends of the shaft 28 extend outwardly some distance at each side of the lug 42 and beyond the flange 43 which surrounds the aperture 40 so as to pass through the valve housing F and be suitably journaled in trunnion bearings 44 which extend outwardly from the plates 45, one on each side of the housing. The plate 45 is secured by bolts 46 to the side of the cover plate 26 and to the housing. Thus, when the rock shaft F is rotated in said bearings, its rocking motion (through its connection by means of the lug 42 in the aperture 40), causes the valve 19 to swing bodily within the chamber 18 of the valve housing, and around the longitudinal axis of the shaft 28 as a pivot, so that the valve gate or disc 35 may be positioned in its upper part to close the conduit D or in the lower part of the housing to close the conduit E, as desired. Thus the disc or gate 35 is seated or unseated by a bodily edgewise movement.

In order that a gas tight connection may be afforded between the gate or disc 35 and its seat 37 in either position of the valve, the following tension devices are employed: These are four in number, similarly constructed, and more particularly illustrated in sectional view in Fig. 11. Through one of the walls 47, 48 (in this instance the wall 47) is provided an aperture 49. A hollow housing 50 provided with an annular flange 51 is attached by suitable bolts 52 to the outside face of the wall 47 in such fashion as to cause the hollow interior of the housing 50 to register with and cover the aperture 49. It will be noticed that the diameter of the interior of the housing 50 is greater than the diameter of the aperture 49, thereby affording a shoulder at 53 against which the flange or head of a plunger bolt 55 may rest when said plunger bolt 55 is extended through the opening 49. At the opposite end of the housing 50 is an adjusting bolt 56 suitably held by a lock nut 57, its inner end having a bearing against a circular and movably arranged disc 58. Interposed between the disc 58 and the head or flange 54 of the plunger bolt 55 is a coiled spring 59. The inner face of the plunger bolt 55 is slightly rounded as shown at 60 and adapted to frictionally bear against the slightly inclined surface of a lug 61, upon the carburetter side of the valve disc or gate 35; that is to say, the lug 61 is on that face opposite to its seat 37.

Thus it will be seen that the plunger bolt 55, acting under the pressure of the spring 59 and engaging the surface 61, will frictionally hold the valve gate 35 against the annular ring or valve seat 37 surrounding the aperture 29, and thus make a complete closure against gas passing through the conduit D. The same result is obtained, for example, when the aperture 31 is to be covered, the valve disc 35 being moved to the lower part of the housing to open the conduit D and close the conduit E. These plungers 55, it will be noticed by reference to Figs. 3 and 5, are four in number and are arranged in pairs, diametrically opposite each other in each pair. The upper pair are necessarily spaced further apart than are the lower pair and because of the large diameter of the conduit D, the upper apertures 29 and 30 are larger in diameter than the lower apertures 31, 32, which latter connect with the conduit E.

In order that the projecting surfaces or lugs 61 shall engage these spring pressed plungers 55, thus located, it is necessary to arrange said lugs 61 also in pairs. By referring to Fig. 6, it will be noted that the pair of lugs or surfaces 61 that are to be engaged with the plungers 55 when the valve 35 is in its upper position, are mounted upon bracket arms 62 which extend diametrically outwardly from the opposite margins of the valve disc or gate 35. The pair of lugs 61 that are to engage the lower pair of plungers 55 are located within the diametric dimension of the valve disc or gate 35, as shown in Fig. 6.

A lever arm L is connected with a suitable operating rod M pivoted thereto at $m$. The outer end of the arm L is provided with the usual counterbalance weight W. The inner end of the lever L is forked or bifurcated to straddle the cover 26 and engage the rock shaft 28. For this purpose, apertured bearing bosses 63 are provided upon the ends of the forks 64 of the lever which fit over and are attached to the rock shaft 28. As shown in the drawing, this bifurcated lever L is formed of two pieces of flat metal 65, 65, suitably bolted together at 66. When the operating arm M is in its lowest position and the lever L depressed, as shown in Fig. 3, the gate disc of the valve 19 is swung up so as to close the openings 29, 30, in the conduit D and when the operating rod M is raised against the pull of the counterbalance weight W, the valve 19 is swung downwardly and closes the openings 31, 32, in the conduit E.

In order that no gases may leak through from around the rock shaft 28, any suitable packing or stuffing box arrangement, indicated at 67, may be employed. The hand hold 25 in the upper part of the housing may be closed by a cap 68 held by suitable bolts 69. A similar opening indicated at 70 in the lower part of the housing, affording means of access to the interior of the housing for cleansing or repairing, is covered with a closure plate 71 pivotally secured to a lever 72, one end of the latter being pivotally mounted at 73. A link 74 is provided with an elongated opening through which the end of the pivoted level 72 is passed, and the lever end is locked in position by means of the hand screw 75. This is a familiar type of locking device and is not further illustrated or described. When it is necessary to enter the lower end of the housing, the hand screw 75 is operated, the link 74 swung outwardly to release the end of the pivoted link 72 whereupon the plate 71 will drop as shown in dotted lines in Fig. 3.

The openings 29 and 30 are tile lined as more particularly shown in Fig. 10. The openings 31, 32, may be similarly tile lined, though not so shown in the drawings. The tile lining in the opening 30 is a circular ring T with its outer and inner walls parallel. The tile lining in the opening 29 is a similar circular ring R, but its inner wall $r$ is tapered or inclined inwardly towards the valve disc or gate 19. By this arrangement of a somewhat constricted passageway, the hot gas is injected into the carburetter side of conduit D, the tile lining tending further to reduce the possibility of undue heating of the valve housing.

The "blast" may be conducted through the blast pipe P (see Fig. 1) from any suitable source of supply, as for example from a Sturtevant blower operated by a motor, not necessary to illustrate herein; the blast being directed to the generator side of the conduit D through the branch pipe $p$ and the valve $p'$ therein (see Figs. 1 and 2), when the openings 29, 30, in the conduit D are closed by the valve disc 19, and being directed to the carburetor side of the conduit D through the branch $e$ and the valve $e'$ therein, when the openings 31, 32, in the conduit E are closed by said valve disc.

When the gas blast is on and the valve disc 19 in its lower position, closing the openings 31, 32, it will be understood that the primary cold air blast will pass into the chamber $a^2$ and upwardly through the generator, and secondary cold air blast will pass through the branch e as stated, to the conduit D. Thus there will be some flow of cold air on both sides of the valve disc 19 which will have a decided tendency to keep this valve disc and the valve housing F cooled down during the blast period when the hot gases are passing from the generator to the carburetter through the conduit D and valve housing. This is the period of time when the valve housing F and its parts are subjected to the maximum heat.

It will be noted by reference to Figs. 13 and 14, wherein I have shown the valve 19 in the lowermost position, and closing the passageway between the ports 31 and 32, that there is a passageway or opening leading from the port 32 through the valve F into the conduit D, said passageway being indicated by the arrow Z. This cold air passage on the carburetor side of the valve might be more properly designated mere "clearance" but it nevertheless permits a flow of cold air upon the carburetor side of the valve disc 19, and exerts a very potent influence in keeping the metal of the valve housing more or less cool. When the valve is in the position shown in Fig. 14, the cold air currents in the passage or port 31 play against the side of the valve disc and thus there is a flow of cold air on both sides of the valve disc which has a decided tendency to keep the disc and the valve housing cooled down during the blast period—the blasting period being the time at which the valve is subjected to the greatest heat. The construction whereby this cooling tendency is effected is of the utmost importance in the practical operation of valves of the character described and illustrated.

It will be observed that the two sets of ports are not connected directly into the carburetter but are connected to conduits D and E which lead into the carburetter. Thus the flow of hot gas in each case passes quickly through the valve housing which latter, it will be observed, is very narrow, enabling the gas to span the gap or opening of the chamber 18 in which the valve gate or disc is movable, without any appreciable amount of the heat units being transmitted to the metal body of the valve housing; and at the same time the relatively greater length and width of the valve housing as compared to its thickness affords the maximum of cooling surface which tends to reduce overheating. Thus, as has been demonstrated in use, overheating is reduced to a negligible quantity, repairs are reduced to a minimum, sticking or wedging of the movable valve gate or disc is eliminated, efficiency in operation is promoted, and the valve as a whole made simple and more durable and its cost of manufacture considerably reduced. It has also been noticed that on account of the relatively large area offered for air cooling, the thinness of the valve gate or disc and the very narrow gap between the two sides of the housing, overheating of the metal near the valve seat and the formation of eddy currents are eliminated. Thus the parts are not readily burned out and the general efficiency of the device is greatly enhanced.

It will also be observed that with my improved valve, the gas "down run" from the lower generator port passes directly through the valve housing to the carburetter by means of the outlet port and conduit E, instead of having to pass vertically upward through the valve body or housing, thus eliminating one of the objections in other constructions where it has heretofore been proposed to use one valve gate or disc for the two outlet ports.

And it will be further observed that by providing a yielding resistance to the valve gate or disc, all tendency to wedging or sticking is eliminated and a better seating action insured than where the valve gate or disc is wedged or closed against a solid or rigid portion of the valve body.

I claim as my invention:

1. A valve housing comprising two plates secured together to form a shallow interior chamber, each plate provided with an upper and a lower aperture therethrough, a single, thin, rocking valve disc or gate movable edgewise in said chamber, and adapted to close either of said apertures, and means for actuating said valve disc, said chamber being substantially the same size between said plates as the thickness of the valve disc.

2. A valve housing comprising two plates spaced apart to form a shallow interior chamber having substantially the same width between said plates as the thickness of the valve disc, a plurality of apertures in each plate arranged to register with similar apertures in the other plate, said pairs of registering apertures opening into said chamber, a valve seat surrounding each of said apertures on the inside of each plate, and a thin valve disc or gate pivotally mounted to the housing, and having edgewise movement within said interior chamber, and means for actuating said disc or gate to close one pair of apertures.

3. A valve housing comprising two side plates of an irregular, octagonal shape enclosing a shallow interior chamber, an inlet aperture in one of said plates and a registering outlet aperture in the other plate, flanged hollow bosses on the outside of the plates surrounding said apertures whereby conduits may be secured to the housing, and a valve seat on the inside of one of the plates surrounding the outlet plate aperture, a thin valve disc or gate within the chamber adapted to be moved edgewise over the valve seat, and means on the outside of and projecting through one of the plates and adapted for pressing the valve gate or disc upon the valve seat.

4. A valve housing comprising two side plates of an irregular octagonal shape enclosing a shallow interior chamber, an inlet aperture in one of said plates and a registering outlet aperture in the other plate, flanged hollow bosses on the outside of the plates surrounding said apertures whereby conduits may be secured to the housing, a valve seat on the inside of one of the plates surrounding the outlet aperture, a thin valve disc or gate within the chamber adapted to be moved edgewise over the valve seat, and means for pressing the valve gate or disc upon the valve seat, said means comprising a plunger mounted on and projecting through one of the housing plates with its inner end in frictional contact with the back of the valve disc or gate.

5. A valve housing comprising two side plates of an irregular octagonal shape enclosing a shallow interior chamber, an inlet aperture in one of said plates and a registering outlet aperture in the other plate, flanged hollow bosses on the outside of the plates surrounding said apertures whereby conduits may be secured to the housing, and a valve seat on the inside of one of the plates surrounding the outlet aperture, a thin valve disc or gate within the chamber adapted to be moved edgewise over the valve seat, and means for pressing the valve disc or gate upon the valve seat, said means comprising a lug on the back of the valve disc or gate and a yieldable plunger bolt mounted in and projecting through one of the housing plates adjacent to the inlet aperture, the end of the plunger bolt contacting with said lug when the valve disc or gate is seated.

6. A valve housing comprising two side plates of an irregular octagonal shape enclosing a shallow interior chamber, an inlet aperture in one of said plates and a registering outlet aperture in the other plate, flanged hollow bosses on the outside of the plates surrounding said apertures whereby conduits may be secured to the housing, and a valve seat on the inside of one of the plates surrounding the outlet plate aperture, a thin valve disc or gate within the chamber adapted to be moved edgewise over the valve seat, and means for pressing the valve disc or gate upon the valve seat, said means comprising a pair of diametrically disposed lugs on the back of said valve disc or gate and a pair of plunger bolts mounted in and longitudinally slidable through one of the side plates of the housing, in the path of movement of the valve gate or disc and a spring for actuating the plunger bolt so that its inner end will contact with a lug.

7. In a valve having inlet and outlet ports arranged in pairs and two valve seats one for each pair, and a valve disc or gate movable edgewise to cover said seats alternately, and means for actuating said valve disc or gate, of means for holding the valve disc or gate to each seat, comprising two pairs of lugs on the back of the valve disc or gate and two pairs of spring actuated bolts located in pairs adjacent each valve seat for contact with their appropriate lugs.

8. In a valve structure having two sets of inlet and outlet ports of different diameters and a valve seat for each outlet port, of a valve disc or gate, movable edgewise to cover either seat, means for effecting said movement, four diametrically disposed lugs on the back of said valve disc or gate and arranged in pairs, one pair being disposed within and the other pair without the margin of the gate or disc, and four plunger bolts arranged in pairs and such distances apart so that one set of bolts will contact with one pair of lugs and the other with the other, when the valve gate is moved to contact with the one or the other seat.

9. A valve housing comprising two side plates of an irregular, octagonal shape enclosing an interior chamber, two pairs of registering inlet and outlet ports in the side plates, one pair of larger diameter than the other, flanged bosses surrounding said ports, a large conduit connected to one set of ports and a conduit of smaller diameter connected to the other set of ports, said conduits being secured to said flanged bosses, a rock shaft in said housing, a valve disc or gate mounted on said shaft, a lever secured at one end to said shaft and provided at its other end with a counterweight, and means for operating said lever to shift the valve disc or gate from one conduit to the other.

10. In a hot air valve, a housing containing two sets of ports and a shallow, interior valve chamber, trunnion bearings projecting from the sides of the housing, a rock shaft in said bearings, having its ends projecting outwardly from the bearings, a thin, valve disc or gate mounted on said shaft and movable edgewise within said chamber, by the rocking of said shaft to close either of said sets of ports, and an operating lever connected at one end to said shaft, said valve disc being of a thickness to substantially fill the interior shallow chamber.

11. In a hot air valve housing provided with an interior chamber and two side plates, a pair of inlet and outlet ports of different diameters, a single valve disc or gate for closing said ports alternately, a rock shaft secured to said valve disc or gate, means outside of the valve housing for operating said shaft, a flanged opening in the housing, a flanged cover plate therefor, semicircular recesses in the flanged opening of the housing and of the cover plate to form bearings for said shafts, apertured, circular end plates upon the shaft ends, each plate being bolted to said housing and to said cover plate and a stuffing box on said end plate.

12. A valve housing comprising two plates spaced apart a distance substantially equal to the thickness of the valve disc or gate, a rocking valve disc movable edgewise through the space between said two housing plates, means for actuating the valve disc, and means for locking the valve disc in a predetermined position against one of said plates to afford a slight clearance between said valve disc and the opposite plate.

13. A valve housing comprising two plates spaced apart a distance substantially equal to the thickness of the valve disc or gate, a pair of ports or passageways extending transversely through said housing plates, a rocking valve disc movable edgewise between the plates to close first one and then the other of said ports, means for actuating the valve disc and means for holding the valve disc against one plate to close one of the ports and at the same time permit the clearance between the valve disc and the other plate for the passage of air.

In testimony, that I claim the foregoing as my invention I affix my signature, in the presence of two witnesses, this 7th day of Feb., 1920.

FRED B. HAYES.

Witnesses:
  THOS. W. STONE,
  K. H. KOHLMEYER.